US011216786B2

(12) United States Patent
Snyder

(10) Patent No.: US 11,216,786 B2
(45) Date of Patent: Jan. 4, 2022

(54) SYSTEM AND METHOD FOR DISPATCHING INTELLIGENT INVITATIONS TO USERS WITHIN A NETWORK

(71) Applicant: Kavita Ramchandani Snyder, Saratoga, CA (US)

(72) Inventor: Kavita Ramchandani Snyder, Saratoga, CA (US)

( * ) Notice: Subject to any disclaimer, the term of this patent is extended or adjusted under 35 U.S.C. 154(b) by 464 days.

(21) Appl. No.: 16/037,891

(22) Filed: Jul. 17, 2018

(65) Prior Publication Data

US 2020/0027063 A1    Jan. 23, 2020

(51) Int. Cl.
*G06Q 10/10* (2012.01)
*H04L 29/08* (2006.01)
*G06F 16/248* (2019.01)
*G06F 16/9535* (2019.01)
*G06F 16/2457* (2019.01)

(52) U.S. Cl.
CPC ....... *G06Q 10/1093* (2013.01); *G06F 16/248* (2019.01); *G06F 16/24578* (2019.01); *G06F 16/9535* (2019.01); *H04L 67/306* (2013.01)

(58) Field of Classification Search
CPC ........... G06Q 10/00–50/00; G06F 1/00–21/00; H04L 1/00–69/00
USPC .............................................. 705/7.11–7.42
See application file for complete search history.

(56) References Cited

U.S. PATENT DOCUMENTS

| | | | | |
|---|---|---|---|---|
| 6,272,467 | B1 * | 8/2001 | Durand | G06Q 10/02 705/26.1 |
| 6,979,267 | B2 * | 12/2005 | Leen | G07F 17/3223 463/42 |
| 7,311,608 | B1 * | 12/2007 | Danieli | A63F 13/12 463/42 |
| 7,614,955 | B2 * | 11/2009 | Farnham | A63F 13/12 463/42 |
| 8,606,784 | B2 * | 12/2013 | Snyder | G06Q 10/06 707/736 |
| 8,732,278 | B2 * | 5/2014 | Fernandez | G06Q 10/10 709/219 |
| 9,087,453 | B2 * | 7/2015 | Krivacic | G06Q 10/02 |
| 9,440,152 | B2 * | 9/2016 | Thompson | A63F 13/35 |
| 9,685,085 | B2 * | 6/2017 | Krivacic | G08G 1/14 |
| 9,744,424 | B1 * | 8/2017 | Snyder | G06Q 10/06311 |
| 9,996,845 | B2 * | 6/2018 | Zhang | G06Q 30/0269 |
| 10,013,494 | B2 * | 7/2018 | Poliakov | G06F 16/9537 |
| 10,049,165 | B1 * | 8/2018 | Snyder | G06F 16/9535 |
| 10,218,784 | B2 * | 2/2019 | Ju | H04L 67/306 |
| 10,580,043 | B2 * | 3/2020 | Publicover | H04L 67/306 |
| 2003/0050113 | A1 * | 3/2003 | Leen | G07F 17/3234 463/25 |
| 2006/0287096 | A1 * | 12/2006 | O'Kelley, II | G07F 17/3276 463/42 |

(Continued)

*Primary Examiner* — Alan S Miller
(74) *Attorney, Agent, or Firm* — The Law Office of Herbert T. Patty

(57) ABSTRACT

The present disclosure is directed to a novel system and method for dispatching intelligent invitations to users within a network. The system may retrieve user profiles which comprise a plurality of attributes. The system may be employed to search for commonalities amongst the plurality of user attributes, rank the commonalities, if any, that are generated from the search, and select any of the highest ranked commonalities. After selecting the highest-ranked commonalities, a league profile may be generated.

11 Claims, 6 Drawing Sheets

(56) References Cited

U.S. PATENT DOCUMENTS

| | | | |
|---|---|---|---|
| 2007/0066397 A1* | 3/2007 | Nammi | G06Q 10/02 463/42 |
| 2007/0233671 A1* | 10/2007 | Oztekin | G06F 16/9535 |
| 2009/0099924 A1* | 4/2009 | Lensch | G06Q 30/0277 705/14.13 |
| 2009/0198666 A1* | 8/2009 | Winston | G06Q 50/01 |
| 2010/0311484 A1* | 12/2010 | Suh | G07F 17/32 463/4 |
| 2011/0246574 A1* | 10/2011 | Lento | G06F 16/958 709/204 |
| 2012/0179540 A1* | 7/2012 | Michaels | G06Q 10/06 705/14.49 |
| 2012/0226645 A1* | 9/2012 | O'Rourke | G06Q 40/06 706/46 |
| 2013/0268512 A1* | 10/2013 | Snyder | G06Q 10/06 707/722 |
| 2013/0290202 A1* | 10/2013 | Nunnery | G06Q 50/01 705/319 |
| 2013/0303268 A1* | 11/2013 | Miller | A63F 13/12 463/25 |
| 2014/0038729 A1* | 2/2014 | Borge | A63F 13/828 463/42 |
| 2014/0040368 A1* | 2/2014 | Janssens | H04L 67/306 709/204 |
| 2014/0249742 A1* | 9/2014 | Krivacic | G08G 1/14 701/400 |
| 2015/0019273 A1* | 1/2015 | Grosz | G06Q 50/01 705/5 |
| 2015/0038233 A1* | 2/2015 | Rom | A63F 13/795 463/42 |
| 2015/0127576 A1* | 5/2015 | Grol-Prokopczyk | G06Q 30/0282 705/347 |
| 2016/0171905 A1* | 6/2016 | Nusbaum | A63B 24/0062 434/127 |
| 2017/0076698 A1* | 3/2017 | Naito | G09G 5/38 |
| 2018/0130138 A1* | 5/2018 | Kumar | H04L 51/32 |
| 2019/0087501 A1* | 3/2019 | Snyder | G06Q 10/02 |
| 2020/0027063 A1* | 1/2020 | Snyder | G06F 16/248 |

* cited by examiner

FIGURE 3

Update: JSmith

User Profile

Profile Name* — 301
First Name* — 302
Last Name* — 303
Age — 304
Gender — 305
Rating — 306
Player Preference 1 — 307
Player Preference 2 — 308
Player Preference 3 — 309
Player Record — 
Venue Preference — 310

[Update] [Cancel]

SYSTEM AND METHOD FOR DISPATCHING INTELLIGENT INVITATIONS TO USERS WITHIN A NETWORK

FIELD OF THE DISCLOSURE

The present disclosure is directed to a novel system and method for generating intelligent invitations to users within a network.

BRIEF DESCRIPTION OF THE DRAWINGS

To facilitate understanding, identical reference numerals have been used, wherever possible, to designate identical elements that are common to the figures. The drawings are not to scale and the relative dimensions of various elements in the drawings are depicted schematically and not necessarily to scale. The techniques of the present disclosure may readily be understood by considering the following detailed description in conjunction with the accompanying drawings, in which:

FIG. 3 is an exemplary illustration of a user profile with fields for attributes associated with an individual user within a network;

DETAILED DESCRIPTION

Figure 1:
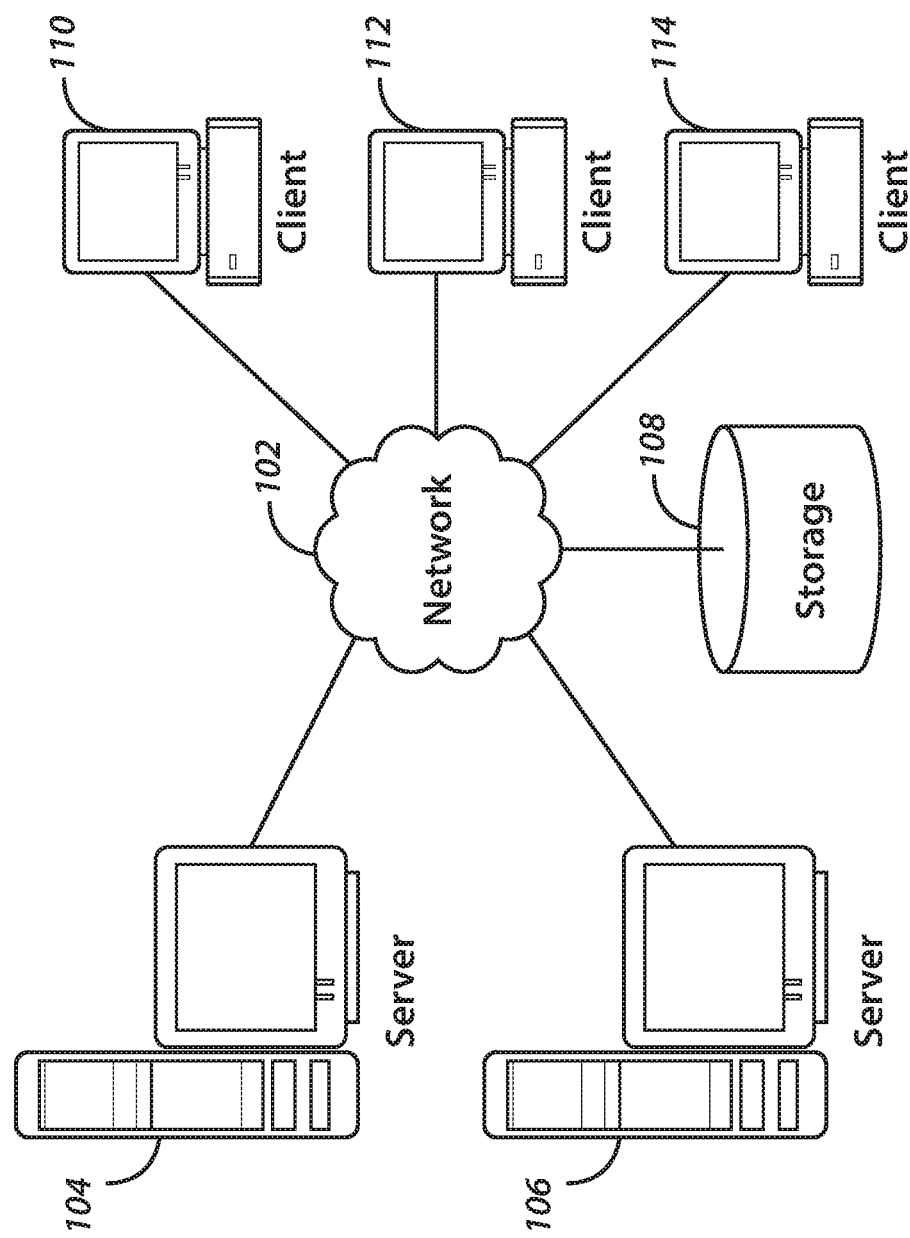
FIG. 1 is an exemplary computer network of data processing systems in which illustrative embodiments may be implemented.

Before the present disclosure is described in detail, it is to be understood that, unless otherwise indicated, this disclosure is not limited to specific procedures or articles, whether described or not. It is further to be understood that the terminology used herein is for the purpose of describing particular embodiments only and is not intended to limit the scope of the present disclosure. It must be noted that as used herein and in the claims, the singular forms "a," and "the" include plural referents unless the context clearly dictates otherwise.

Where a range of values is provided, it is understood that each intervening value, to the tenth of the unit of the lower limit unless the context clearly dictates otherwise, between the upper and lower limit of that range, and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also included in the disclosure. The term "about" generally refers to ±10% of a stated value.

As will be appreciated by one skilled in the art, the present disclosure may be embodied as a system, method or computer program product. Accordingly, the present disclosure may take the form of an entirely hardware embodiment, a software embodiment (including firmware, resident software, micro-code, etc.) stored in a storage device, or an embodiment combining software and hardware aspects that may all generally be referred to herein as a "circuit," "module," or "system." Furthermore, the present disclosure may take the form of a computer program product embodied in any storage device having computer readable program code embodied in the medium.

Any combination of one or more computer-readable storage device may be utilized. The computer-readable storage device may be, for example but not limited to, an electronic, magnetic, optical, electromagnetic, infrared, or semiconductor system, apparatus, or device. More specific examples (a non-exhaustive list) of the computer-readable storage device may include the following: a portable computer diskette, a hard disk, a random access memory (RAM), a read-only memory (ROM), an erasable programmable read-only memory (EPROM or flash memory), a portable compact disc read-only memory (CDROM), an optical storage device, or a magnetic storage device. processed in a suitable manner, if necessary, and then stored in a computer memory. In the context of this document, a computer-usable or computer-readable medium may be any medium that may contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that may direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
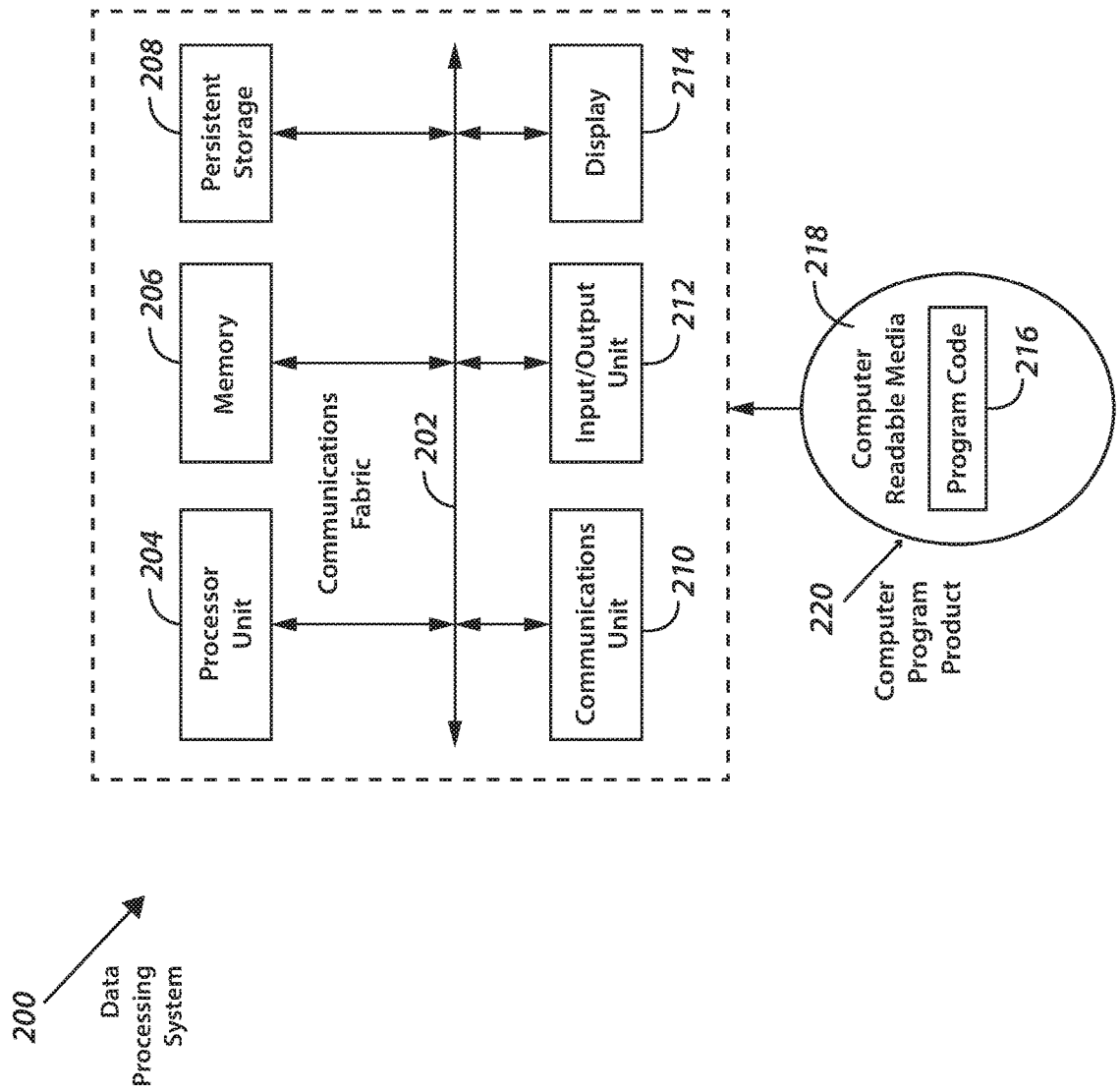
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to data processing environments in which different illustrative embodiments may be implemented. Many modifications to the depicted environments may be made.

FIG. 1 depicts a pictorial representation of a network of data processing systems in which illustrative embodiments may be implemented. Network data processing system 100 is a network of data processing systems, such as, for example, computers and other devices, in which the illustrative embodiments may be implemented. Network data processing system 100 includes one or more networks 102 provides communication links between the various computers and other devices connected together within the network data processing system 100. Network 102 may include connections, such as wire(s), wireless communication links, or fiber optic cables.

In the depicted example, server 104, server 106, and storage unit 108 are all connected to network 102. Storage unit 108 represents any type of storage device that is capable of storing data in a structured or unstructured format. Additionally, storage unit 108 may represent a plurality of storage units coupled to network 102. In some embodiments of the present disclosure, storage unit 108 may, for example, be any database within an enterprise that stores and manages reusable software assets and any other data related to these reusable software assets. In addition, storage unit 108 may be a standards-based business service repository that captures information regarding business services, business policies, and service subscribers.

Client devices 110, 112, and 114 are also connected to network 102. Client devices 110, 112, and 114 may, for example, be personal computers, network computers, laptop computers, handheld computers, personal digital assistants (PDAs), or smart cellular telephones (e.g., smartphones). Users, such as solution architects, may utilize client devices 110, 112, and 114 to automatically create software application designs for an enterprise using the reusable software assets stored in storage unit 108.

In the embodiment shown, client devices 110, 112, and 114 are clients to server 104 and/or server 106. In addition, server 104 and/or server 106 may provide data, such as, for example, boot files, operating system images, and applications to client devices 110, 112, and 114. Moreover, network data processing system 100 may include additional servers, clients, and other devices not shown to implement processes of illustrative embodiments.

Of course, network data processing system 100 may be implemented as a number of different types of networks, such as, for example, an intranet, a local area network (LAN), a wide area network (WAN), or the Internet. Also, it should be noted that FIG. 1 is only intended as an example and not as an architectural limitation for the different illustrative embodiments. For example, illustrative embodiments may be implemented within a single data processing system instead of within a network data processing system.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display unit 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory (RAM) or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208. In addition, persistent storage 208 may represent a plurality of persistent storage units.

Communications unit 210, in these examples, provides for communications with other data processing systems or devices, such as, for example, server 104 in FIG. 1. In these examples, communications unit 210 is a network interface card. Communications unit 210 may provide communications through the use of either, or both, physical and wireless communications links.

Input/output unit 212 allows for input and output of data with other devices that may be connected to data processing system 200. For example, input/output unit 212 may provide a connection for user input through a keyboard. Display unit 214 provides a mechanism to display information to a user of data processing system 200.

Instructions for the operating system and applications or programs are located on persistent storage 208. The instructions for the operating system and applications or programs may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different illustrative embodiments may be embodied on different physical or tangible computer-readable media, such as memory 206 or persistent storage 208.

Program code 216 is located in a functional form on computer-readable media 218 and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive or a flash memory that is connected to data processing system 200. The tangible form of computer-readable media 218 is also referred to as computer-recordable storage media.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communication links or wireless transmissions containing the program code.

The different components illustrated for data processing system 200 are not meant to provide architectural limitations to the manner in which different illustrative embodiments may be implemented. The different illustrative embodiments may be implemented in a data processing system including components in addition to, or in place of, those illustrated for data processing system 200. Other components shown in FIG. 2 may be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub, which may be present in communications fabric 202.

The present disclosure provides a manner of generating one or more customized league profiles which meet the attributes of a set of user profiles. The user profiles may be associated with members of a sports club, fitness club, social network, etc. In some embodiments, the user profiles may be stored in and retrieved from a computer database. Accordingly, user profiles may be ranked and then used to generate one or more league profiles which best reflect the attributes of users in a network (e.g., sports club, fitness club, social network, etc.). Once a league profile is a generated, a system (e.g., software application) which employs the present disclosure may dispatch "intelligent invitations" to users within a network whose profiles best reflect the attributes associated with the generated league profile. The intelligent invitations may be any form of a message to the recipient for a request to join a league. For example, the intelligent invitations may be in the form of an email, text message, chat message or the like.

For example, the attributes associated with each user profile may be compared with the attributes associated with the generated league profile. In one embodiment, if a user profile has all of the attributes that are associated with the generated league profile, the user is sent a message requesting for the user associated with the user profile to join the league. In yet another embodiment, if a user's profile has greater than a threshold number of attributes associated with the generated league profile, the user is sent a message requesting to join the league.

Furthermore, the invitations may include details about the league (e.g., league type, proposed schedule roster, etc.). The invitations may be sent by any suitable means such as, but not limited to email, text message, chat message, robo-call, etcetera. In response to receiving an invitation, a user may elect to join the league or simply decline. In some embodiments, a client device (e.g., smartphone) associated with a user may receive invitations to join a league or team via a software application installed thereon.

FIG. 3 is an exemplary illustration of a user profile 300 with fields for attributes associated within an individual user within a network. As shown, a user profile 300 lists several attributes set out in various fields 301-310. As shown, exemplary attributes may include a user's age, first and last name, gender, player rating, player preference (e.g., teammates, game type, player position(s), player record, and venue preferences. It should be understood by those having ordinary skill in the art that the present disclosure is not limited to the attributes shown in FIG. 3. In addition, some of the attributes associated with the use profiles may be excluded from searches to identify commonalities amongst user profiles for any of various reasons (e.g., privacy, relevance, etc.) as will be explained in more detail below.

In some embodiments, a league profile may be generated based on the attributes listed in the user profiles 300. However, not all of the user profiles need to include the same attribute fields for a league profile to be generated. For example, the user profiles may be associated with various organizations (e.g., recreational centers) which may have different fields. One or more league profiles may be generated despite the fact that a set of user profiles have different attribute types in their profiles.

Advantageously, the user profiles may be associated with an individual profile or team profile. For example, if a user profile represents a profile of a team, and a threshold number of attributes are reflected by the team's (user) profile, an intelligent invitation may be sent to each member of the team or the team's representative.

Figure 4:
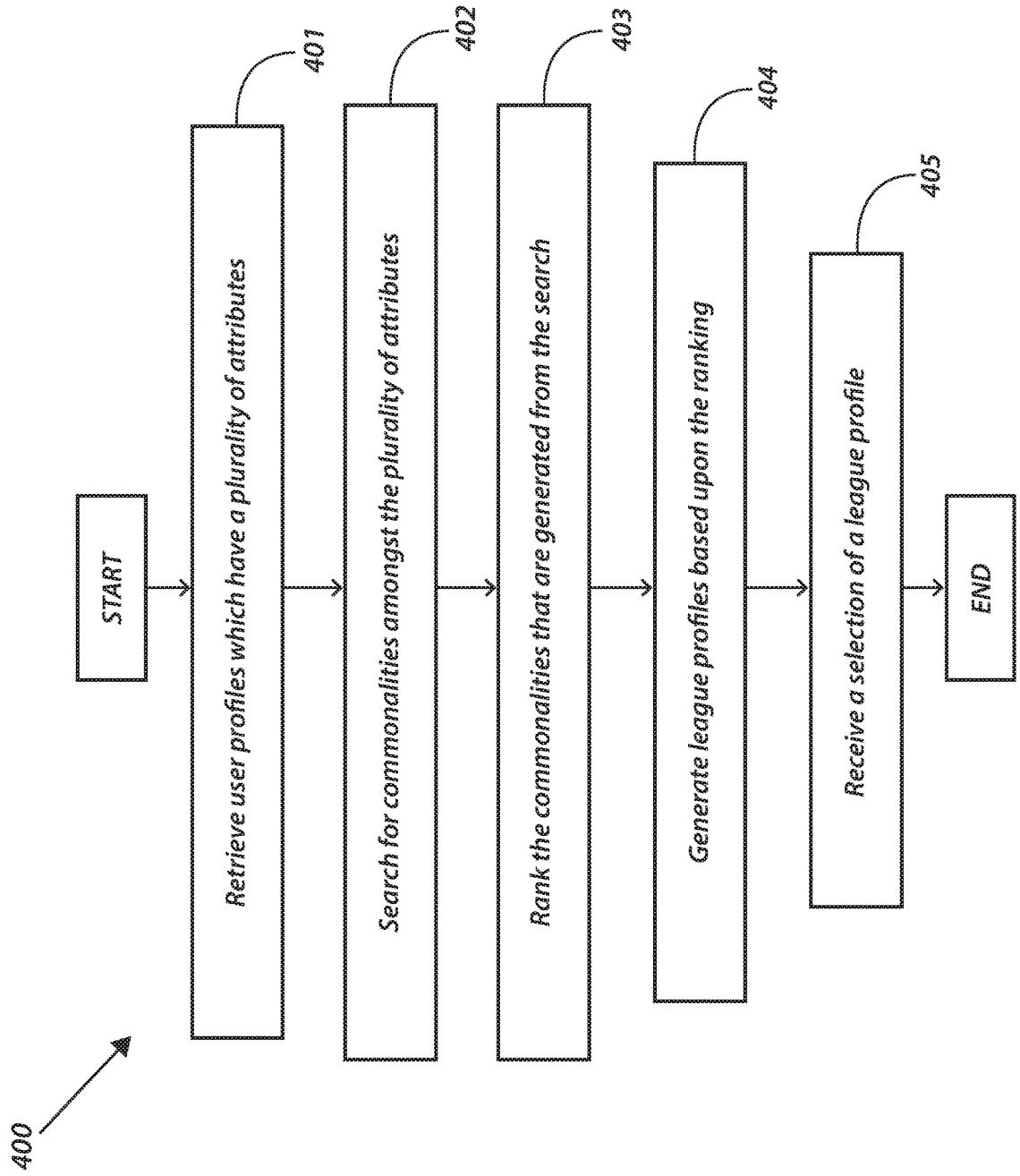
FIG. 4 is a flowchart of a method for generating one or more league profiles.

FIG. 4 is a flowchart 400 of a method for generating one or more league profiles. Flowchart 400 begins with retrieving user profiles (block 401). The user profiles may be retrieved from a database of information associated with members of one or more clubs (e.g., recreational clubs). A system that employs the present disclosure may be adapted such that specific user profile(s) have a greater weight than other user profiles to thereby influence the aggregate attribute output when generating league profiles. For example, user profiles of members of a recreational center may be weighted according to a membership classification.

In one embodiment of the present disclosure, the user profiles retrieved are filtered such that only certain users associated with the user profiles are considered for constructing a league (or team). For example, the system may filter user profiles such that they only include users that are connected in some way. For example, each user profile may include a user's social media connections and the user profiles may be filtered, either before or after the system performs a search for commonalities.

Flowchart 400 proceeds to searching for commonalities amongst user profiles within a set (e.g., a database). For instance, a search may reveal that the greatest commonality among user profiles within a set are female members which prefer to play matches on Monday evenings from 6-8 pm (block 402). Next, the commonalities, if any, that are generated from the search may be ranked (block 403). The commonalities may be ranked from greatest to least. Ranking the commonalities may comprise tallying the total number of attributes that each user has in common with other users within the set and then ranking the commonalities from greatest to least. A software application may be employed to select at least one of the highest ranked commonalities. Accordingly, a software application which employs the present disclosure may rank and select user commonalities to create a league profile that is customized to the users represented in the set. In some implementations, artificial intelligence techniques may be used to search for commonalities within a set and search for attribute trends associated with the profiles of new users.

For example, upon ranking the commonalities, it may be revealed that the greatest commonality amongst all users within the set is according to their user profiles that the users are female whereas the least commonality is that they have an amateur player rating.

Next, the method proceeds with generating one or more league profiles based upon a previous ranking (block 404). The league profiles may be generated based on any of the ranked commonalities. For example, a league profile may be generated from a highest ranked commonality, a number of highest-ranked commonalities, etcetera.

Contrariwise, a league profile may be generated based on a median number of commonalities with the intent to create a league that accounts for many users within the set. Once the league profiles are generated, one or more league profiles may be selected by an administrator (block 405).

A league profile may be chosen from one of the generated league profiles in various ways. An algorithm may be employed to automatically select one of the generated league profiles based upon pre-defined rules. For example, an algorithm may select one of the generated league profiles via a round-robin, weighted round-robin, random, or other suitable means. In yet other implementations, the generated profiles may be selected by various artificial intelligence techniques which may rely on other data external to the information included within the user profiles.

Once a league profile is selected, one or more invitations may be dispatched to users within the network whose profiles match the commonalities from which the selected league profile was created (block 406). For example, if the league profile was generated based on the user attributes of an experienced (player rating) female (gender) between the ages of 31 and 35 (age), the system will only send out invitations to users whose profiles reflect these attributes.

In addition, updates may be sent to the users which received the invitations to join the league. The updates may include information regarding acceptances by the users or other users which were sent the invitations, declines, and other information pertinent to the league. For example, a user may receive an update that the league has been filled and that no other users may elect to join. Another example may involve a user receiving an update of the number of spots left for joining the league.

In some embodiments of the present disclosure, the software application may generate one or more teams for the selected league profiles. For example, in response to a selected league profile, the system may automatically generate users for one or more teams for the selected league(s). As such, the communications sent to the users may include an invitation to play in a league on a certain team. The names of the other teammates (or proposed teammates) and other user attributes may be included in the communication. In the event that a user recipient of the communications declines the invitation to join the team, the user may be sent further communications to determine whether they want to join the league but on a different team. In the event that a user recipient of the communications declines the invitation to join the league all together, another user which has a profile that meets the criteria of the (generated or retrieved) league profile may be sent an invitation to join a team and the league.

In addition, the users may have filtering options on their companion software application on their client device to exclude receipt of certain types of invitations. For example, if a user is not interested in the sport of basketball, the user may elect to not receive invitations about joining a basketball league. Furthermore, a user may elect via an option on the software application to only join a league or team if the users which have been sent or have confirmed to join are a member of a user's buddy list, contact list, social media connection or within a certain degree of social media connections, age, gender, match location, or peer rating. As such, the system allows users to be aware of and control the types of people that they will be involved with socially.

Figure 5:
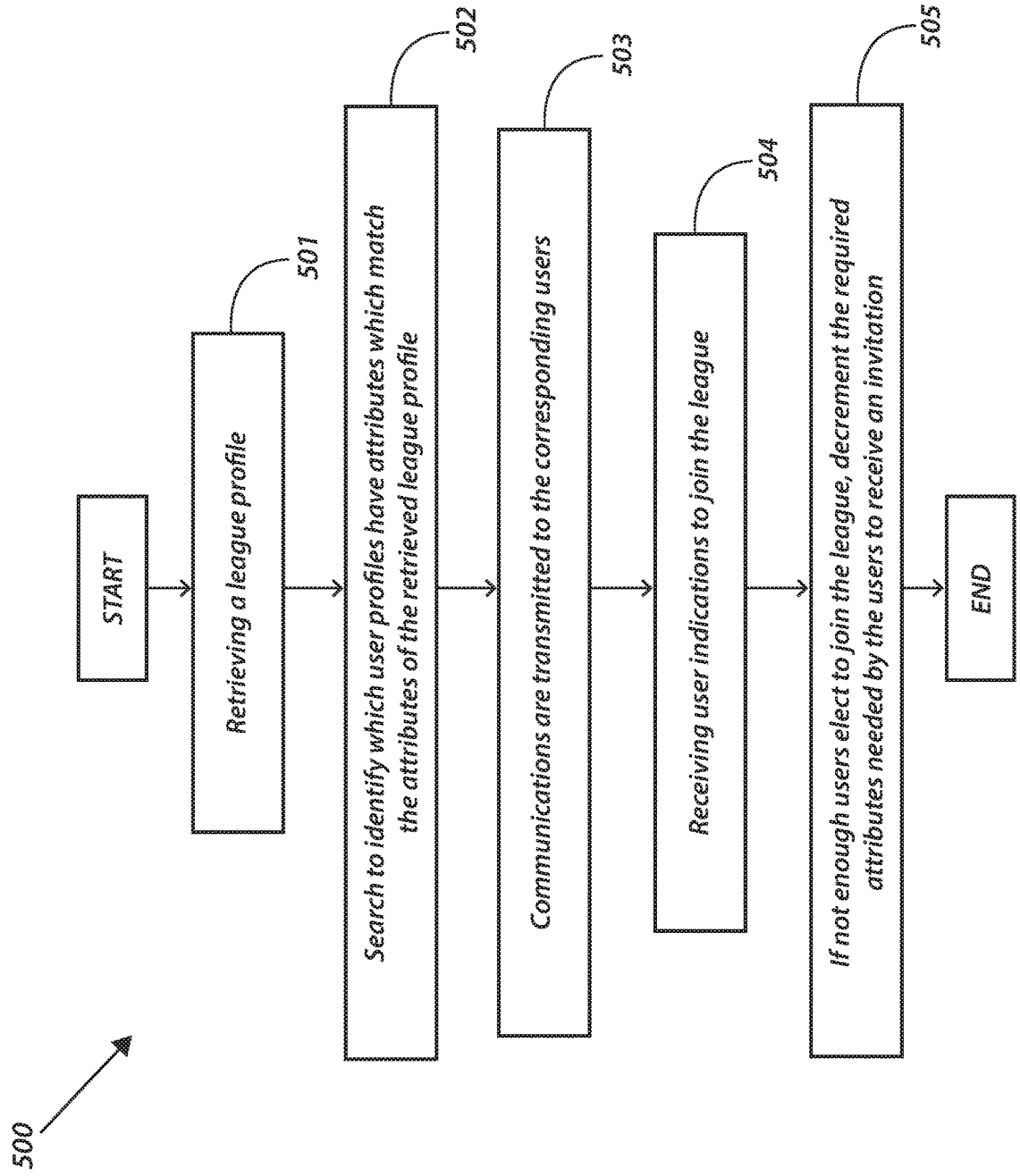
FIG. 5 is a flowchart of a method for generating and sending invitations to a plurality of users which meet a criteria of a pre-generated league profile.

FIG. 5 is a flowchart 500 of a method for generating and sending invitations to a plurality of users which meet a criteria of a pre-generated league profile. However, in some embodiments, a system employing the present disclosure may retrieve, without generating, the league profile(s). The league profiles may be retrieved from a computer database or any other suitable electronic storage means. For example, a software application may include pre-configured default league profiles which an administrator may select according to the goals of the administrator's organization. For example, the software application may have a default league profile that is specifically customized for most users according to the profiles within a set.

Advantageously, an administrator may select any one, or a combination of league profiles, and dispatch invitations that have the attributes that are associated with the selected league profiles. In some implementations, the league profile may contain criteria which reflect the attributes from which the profile was generated. Simply put, the invitations are sent to users which best meet the attributes of the league profile.

Flowchart 500 begins with retrieving a league profile (block 501). Retrieving a league profile may include retrieving a single league profile resident within a software application network server or accessible storage. In addition, retrieving a league profile may include selecting a hybrid of two or more league profiles.

A software application may create hybrid league profiles by any suitable means. In some embodiments, a software application combines some or all of the attributes associated with the league profiles to create a hybrid profile. For example, a hybrid profile may be created by incorporating the attributes with the highest commonalit(ies) from each respective league profile. If the top attributes of the league profiles for which a hybrid league profile is to be created represents a sufficient number of users to fill the league, no further attributes are added. In contrast, if too many users are identified which meet the attributes of the hybrid league, additional attributes may be included to limit the number of available users to join the league (or team).

After a league profile is retrieved, the software application performs a search through the available user profiles to identify which user profiles have attributes that match the attributes of the retrieved league profile (block 502).

Once the user profiles are identified which match the attributes associated with the league profile, one or more communications (e.g., invitations) are transmitted to the corresponding users (block 503). The users, in turn, may accept or decline to participate in the league by making an indication on their client device (e.g., smartphone). The users' indications may be received by a server which hosts the software application system (block 504). If not enough users accept the invitations to join the league (or team), the system may send additional invitations to users whose profiles include attributes that do not directly match the attributes associated with the league profile. In some implementations, if not enough users elect to join the league, the system that employs the present disclosure may reduce the required attributes associated with the league profile to receive an invitation (block 505) to increase the available prospects to fill the league (or team).

Figure 6:
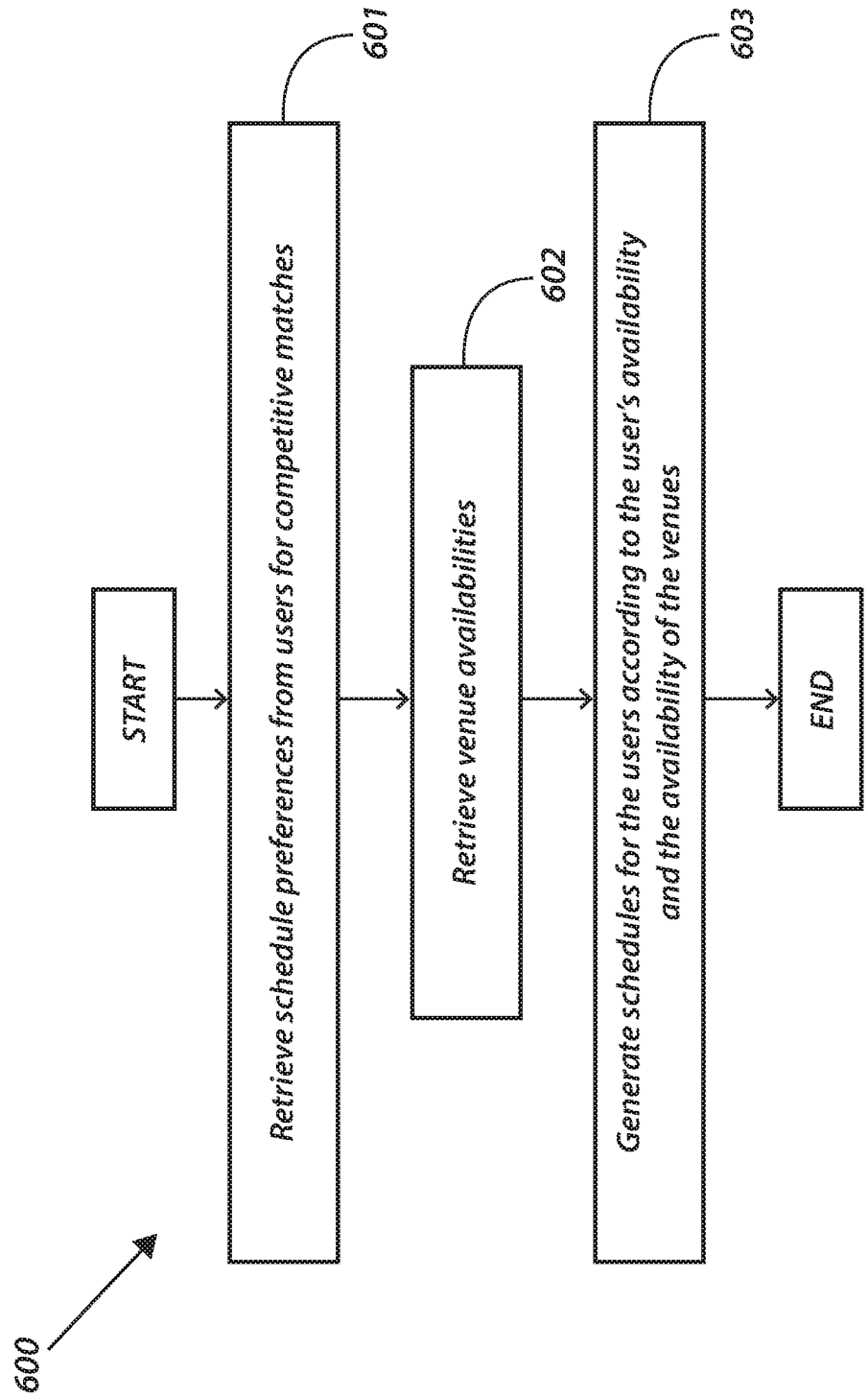
FIG. 6 is a flowchart of a method for generating league schedules based on user and venue availability.

FIG. 6 is a flowchart 600 for generating league schedules based upon user and venue availability. Initially, schedule preferences are retrieved from users for a set of competitive matches (block 601). In some implementations, each competitive match is to be held at an individual sub-venue within a designated venue on the same day. The schedule preferences may be present in a user's profile in a digital format such that they may be obtained via a computing means.

Next, the availabilities of venues are retrieved (block 602). Accessing the availability of a plurality of venues may be accomplished by accessing one or more databases. In some implementations, the user profiles which include user availability and venue availability are resident on a single server.

Once the user and venue availabilities are retrieved, a software application may generate schedules for the users (block 603). The generated schedules are balanced amongst all of the users. As such, a league organizer may generate schedules for practices and matches for teams without manual intervention. Furthermore, weather information in a digital format may be retrieved and used to generated the user schedules. In addition, schedules may be regenerated based on new weather information.

Accordingly, the present disclosure employs a software application that may create custom leagues based on the attributes of users in a network. In addition, the software application may send invitations to users to join a league. Moreover, the software application may generate the best schedules for practices and matches for users based on user preferences. Additionally, a system which employs the present disclosure may be configurable to regenerate practice and match schedules, in addition to generate proposals for league modifications (e.g., in the future) in response to significant changes to the collection of user profiles. For example, the system may have one or more league profiles that change based upon the attributes associated with the user profiles within the network. For instance, if a league profile has a first set of attributes (e.g., women over 35, single matches on Saturday at 10 am), the league profile may change to reflect the attributes of the users accounting for new the user sign-ups (e.g., women between 21-35, doubles, matches on Saturdays at 1 pm). Most notably, a system described herein may employ artificial intelligence to account for trends, anomalies, etc.

A novel system and method for dispatching intelligent invitations to users within a network has been described. It will be understood that the descriptions of some embodiments of the present disclosure do not limit the various alternative, modified, and equivalent embodiments which may be included within the spirit and scope of the present disclosure as defined by the appended claims. Furthermore, in the detailed description above, numerous specific details are set forth to provide an understanding of various embodiments of the present disclosure. However, some embodiments of the present disclosure may be practiced without these specific details. In other instances, well known methods, procedures, and components have not been described in detail so as not to unnecessarily obscure aspects of the present embodiments.

The invention claimed is:

1. A computing device comprising a non-transitory machine-readable storage medium containing instructions that, when executed, causes a server having a first computer processor, a first memory, and a first input/output unit to: retrieve a plurality of user profiles, each user profile comprises one or more user attributes; causes the server to filter the user profiles based on connections between users; causes the server to search for commonalities amongst the plurality of user profiles based on the one or more attributes; when commonalities are identified as a result of the search, causes the server to rank the commonalities according to a number of users which share each attribute; causes the server to select at least one of the highest ranked commonalities; causes the server to generate at least one league profile based upon the selection of the at least one of the highest ranked commonalities; and causes the server to output the at least one league profile to a client device having a second computer processor, a second memory, and a second input/output unit:

wherein to rank the commonalities includes tallying the one or more user attributes that each user has with the one or more user attributes of other users and ranking the commonalities from a greatest to a least number of commonalities.

2. The computing device of claim 1, wherein the non-transitory computer readable medium further stores computer readable instructions, when executed, causes the server to dispatch invitations to users whose profiles match at least one of the commonalities from which the at least one league profile was generated.

3. The computing device of claim 1, wherein the one or more user attributes stored within the non-transitory computer readable medium includes practice availability, match availability, player rating, and contact information.

4. The computing device of claim 1, wherein each user profile stored within the non-transitory computer readable medium is an individual profile.

5. The computing device of claim 4 further comprising computer readable instructions, when executed, causes the server to generate a plurality of teams by selecting user profiles which match the selected league profile.

6. The computing device of claim 1, wherein each user profile is a team profile.

7. The computing device of claim 1, wherein the at least one of the highest-ranked commonalities comprises two of the highest ranked commonalities.

8. The computing device of claim 1, wherein the at least one league profile is a hybrid of at least two generated league profiles.

9. The computing device of claim 1, wherein at least one of the one or more user attributes are excluded from the search for commonalities amongst the user profiles.

10. The computing device of claim 1, wherein invitations are sent to client devices associated with the user recipients.

11. The computing device of claim 1, wherein invitations include details of the league profile and an invitation to participate.

\* \* \* \* \*